United States Patent
Dayrell-Armes et al.

(10) Patent No.: US 12,190,572 B2
(45) Date of Patent: Jan. 7, 2025

(54) DROPLET PROCESSING METHODS AND SYSTEMS

(71) Applicant: Sphere Fluidics Limited, Cambridgeshire (GB)

(72) Inventors: Nicholas Dayrell-Armes, Cambridgeshire (GB); David Holmes, Cambridgeshire (GB); Frank F Craig, Cambridgeshire (GB); Marian Rehak, Cambridgeshire (GB); Dimitris Josephides, Cambridgeshire (GB); Robert Salter, Cambridgeshire (GB); William Whitley, Cambridgeshire (GB); Sinan Gokkaya, Cambridgeshire (GB); Raphael Ruis, Cambridgeshire (GB)

(73) Assignee: SPHERE FLUIDICS LIMITED, Cambridge (GB)

( * ) Notice: Subject to any disclaimer, the term of this patent is extended or adjusted under 35 U.S.C. 154(b) by 974 days.

(21) Appl. No.: 17/266,447

(22) PCT Filed: Aug. 6, 2019

(86) PCT No.: PCT/GB2019/052206
§ 371 (c)(1),
(2) Date: Feb. 5, 2021

(87) PCT Pub. No.: WO2020/030903
PCT Pub. Date: Feb. 13, 2020

(65) Prior Publication Data
US 2021/0293691 A1 Sep. 23, 2021

(30) Foreign Application Priority Data
Aug. 8, 2018 (GB) ..................... 1812912

(51) Int. Cl.
*G06V 10/82* (2022.01)
*B01L 3/00* (2006.01)
(Continued)

(52) U.S. Cl.
CPC ........ *G06V 10/82* (2022.01); *B01L 3/502784* (2013.01); *G01N 15/1433* (2024.01);
(Continued)

(58) Field of Classification Search
CPC .... G06V 10/82; G06V 10/454; G06V 10/764; G06V 20/698; B01L 3/502784;
(Continued)

(56) References Cited

U.S. PATENT DOCUMENTS

2005/0112541 A1* 5/2005 Durack .............. G01N 33/5005
   435/40.5
2016/0224730 A1* 8/2016 Yu .......................... G16B 50/30
(Continued)

FOREIGN PATENT DOCUMENTS

CN   106600577 A   4/2017
CN   107169556 A   9/2017
(Continued)

OTHER PUBLICATIONS

Huang, et al. "Machine Learning Based Single-Frame Super-Resolution Processing for Lensless Blood Cell Counting", Sensors 2016, 16, 1836; doi:10.3390/s16111836.
(Continued)

*Primary Examiner* — Amara Abdi
(74) *Attorney, Agent, or Firm* — Tarolli, Sundheim, Covell & Tummino LLP

(57) ABSTRACT

A method of processing droplets in a microfluidic system. The method may comprise capturing a time sequence of images of a droplet as it passes through a channel in a microfluidic system. The method may further comprise
(Continued)

processing each image of the sequence of images using a convolutional neural network to count a number of cells or other entities visible in each image the droplet. The method may further comprise processing the count of the number of cells or other entities visible in each image of the droplet to determine an estimated number of cells or other entities in the droplet. The method/system may further comprise controlling a microfluidic process performed on the droplet responsive to the estimated number of cells or other entities in the droplet. Implementations of the method use the changing orientation and disposition of droplet contents in combination with machine learning to improve monoclonality assurance.

4 Claims, 8 Drawing Sheets

(51) Int. Cl.

| | | |
|---|---|---|
| *G01N 15/14* | (2006.01) | |
| *G01N 15/1433* | (2024.01) | |
| *G06F 18/2431* | (2023.01) | |
| *G06T 7/70* | (2017.01) | |
| *G06V 10/44* | (2022.01) | |
| *G06V 10/764* | (2022.01) | |
| *G06V 20/69* | (2022.01) | |
| *G01N 15/10* | (2006.01) | |

(52) U.S. Cl.
CPC ..... *G01N 15/1459* (2013.01); *G01N 15/1484* (2013.01); *G06F 18/2431* (2023.01); *G06T 7/70* (2017.01); *G06V 10/454* (2022.01); *G06V 10/764* (2022.01); *G06V 20/698* (2022.01); *B01L 2200/0652* (2013.01); *B01L 2200/0673* (2013.01); *B01L 2300/0864* (2013.01); *G01N 2015/1006* (2013.01); *G01N 2015/1486* (2013.01); *G01N 2015/1488* (2013.01); *G06T 2207/10016* (2013.01); *G06T 2207/10064* (2013.01); *G06T 2207/20084* (2013.01); *G06T 2207/30024* (2013.01); *G06T 2207/30242* (2013.01)

(58) Field of Classification Search
CPC ..... B01L 2200/0652; B01L 2200/0673; B01L 2300/0864; B01L 2200/143; B01L 2300/0654; G01N 15/1433; G01N 15/1459; G01N 15/1484; G01N 2015/1006; G01N 2015/1486; G01N 2015/1488; G01N 15/149; G01N 35/08; G01N 2015/1481; G06F 18/2431; G06T 7/70; G06T 2207/10016; G06T 2207/10064; G06T 2207/20084; G06T 2207/30024; G06T 2207/30242
See application file for complete search history.

(56) References Cited

U.S. PATENT DOCUMENTS

| | | | |
|---|---|---|---|
| 2017/0267871 A1* | 9/2017 | Nowak | C09D 5/1681 |
| 2018/0133715 A1 | 5/2018 | Craig et al. | |
| 2018/0137338 A1 | 5/2018 | Kraus et al. | |
| 2018/0193559 A1* | 7/2018 | Hirata | G01F 1/72 |
| 2018/0211380 A1 | 7/2018 | Tandon et al. | |
| 2019/0156481 A1* | 5/2019 | Sekiguchi | G06V 20/698 |
| 2019/0302000 A1* | 10/2019 | Lo | G01J 3/0229 |
| 2019/0384963 A1* | 12/2019 | Kim | G06T 7/74 |
| 2020/0159185 A1* | 5/2020 | Watanabe | B33Y 50/00 |
| 2020/0167914 A1* | 5/2020 | Stamatoyannopoulos | G16B 40/30 |

FOREIGN PATENT DOCUMENTS

| | | |
|---|---|---|
| CN | 108362628 A | 8/2018 |
| EP | 3264070 A1 | 1/2018 |
| GB | 2516684 A | 2/2015 |
| WO | 2010003041 A2 | 1/2010 |
| WO | 2016193758 A1 | 12/2016 |
| WO | 2018102748 A1 | 6/2018 |

OTHER PUBLICATIONS

Wei, et al. "Neural network control of focal position during time-lapse", Department of Biophysics, Johns Hopkins University, Baltimore, MD 21218, USA, 2017.
GB Search Report for Application No. GB1812912.2 dated Feb. 5, 2019.

* cited by examiner

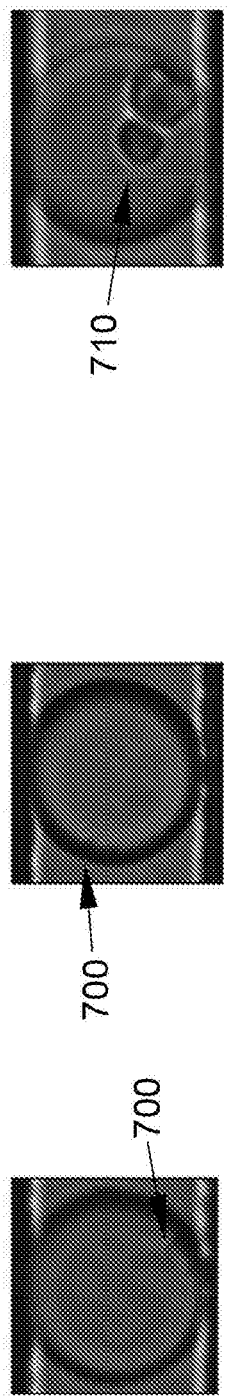
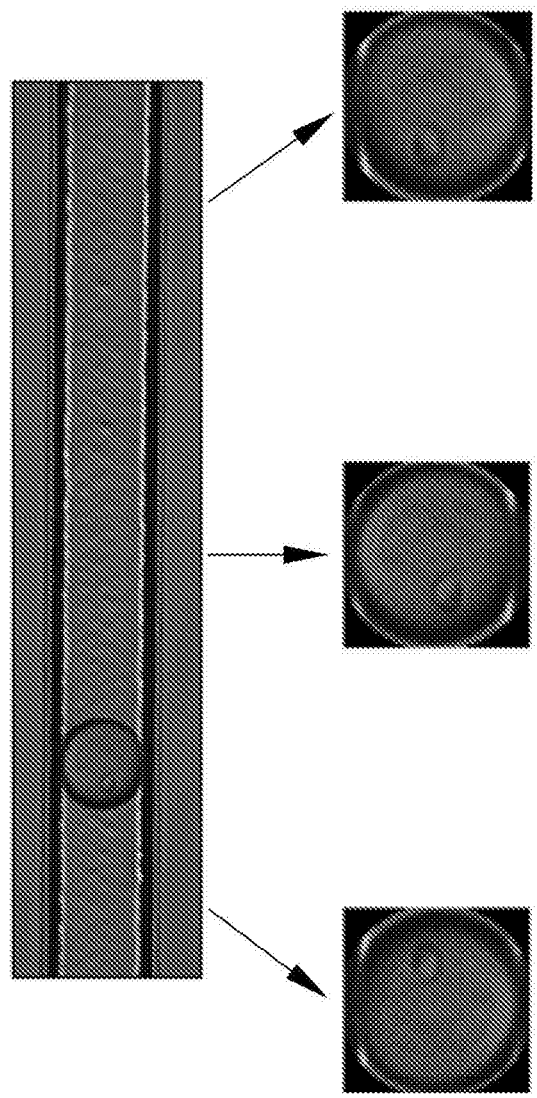
Fig. 7a
Fig. 7b

DROPLET PROCESSING METHODS AND SYSTEMS

RELATED APPLICATIONS

The present invention is a U.S. National Stage under 35 USC 371 patent application, claiming priority to Serial No. PCT/GB2019/052206, filed on 6 Aug. 2019; which claims priority of GB 1812912.2, filed on 8 Aug. 2018, the entirety of both of which are incorporated herein by reference.

FIELD

This invention relates to techniques for processing droplets in a microfluidic system.

BACKGROUND

This specification is generally concerned with emulsions, typically comprising microdroplets of water in oil, often surfactant-stabilised. One or more biological entities such as one or more living cells or particles may be incorporated into each droplet and then experiments performed within the droplet, for example to perform a biological assay. Microdroplets can be generated and processed quickly, potentially at rates in excess of several thousand per second.

Typically the oil composition comprises a fluorous and/or mineral oil and, preferably, a surfactant, for example at around 0.5-5% vol/vol. Use of a fluorous oil is particularly advantageous when the microdroplets contain living entities because fluorous oil is good at transporting oxygen to the microdroplets. The surfactant may be either polymeric or small molecule; for example surfactants derived from block co-polymers of perfluoroethers such as Krytox™ or polyethylene glycol (PEG) may be used. The material or analyte within a microdroplet may comprise, for example, cells, DNA, protein, peptide, beads, particles, crystals, micelles, macromolecules, material for an enzymatic assay, organelles, an organism such as cell for example a mammalian cell, yeast cell, algal cell or bacterium, a virus, a prion and so forth. Typically a droplet has a diameter in the range 1-120 μm although droplets may be larger (or smaller), giving a volume which may be in the range nanolitres to femtolitres.

The applicant has previously described techniques for processing droplets of this type in WO2016/193758. However improved techniques are still desirable. For example it can be desirable to increase the assurance of monoclonality as determined by the probability of selected droplets containing a single cell, for example so that a population of substantially identical cells or numbers of cells can be generated.

SUMMARY

In a first aspect there is provided a method/system of processing droplets in a microfluidic system. The method/system may comprise capturing a (time) sequence of images of a droplet as it passes through a channel in a microfluidic system. The method/system may further comprise processing each image of the sequence of images using a convolutional neural network to count a number of cells or other entities visible in each image the droplet. The method/system may further comprise processing the count of the number of cells or other entities visible in each image of the droplet to determine an estimated number of cells or other entities in the droplet. The method/system may further comprise controlling a microfluidic process performed on the droplet responsive to the estimated number of cells or other entities in the droplet.

Counting cells or other entities contained within a droplet in a microfluidic system is a challenging task because, among other things, the cells/entities can become stuck to the edge of a droplet and/or to one another (if more than one is present), and one cell/entity may occlude another. However it has been observed that as the droplets travel through a microfluidic channel it has been observed that the orientation of droplets and disposition of their contents can change. In some implementations of the method this is exploited by capturing a sequence of droplet images and then processing them with a (convolutional) neural network to determine a number of cells/entities in each. The results are then combined to determine an estimated actual number of cell/entities in a droplet. Thus implementations of the method use the changing orientation and disposition of droplet contents in combination with a machine learning-based approach to improve monoclonality assurance.

In some implementations the combining of the cell/entity counts may involve taking a mode of the separate counts; in other implementations the combining of the cell/entity counts may involve determining a maximum count of the number of cells/entities, which is thus robust to occlusion of one cell/entity by another. However in practice both these approaches have been found to work well. In implementations the sequence may comprise an odd number of images; the sequence may have less than 30 images, for example five images.

In some implementations of the method counting the number of cells/entities visible in a droplet image comprises classifying the image of the droplet into one of a plurality of categories. The categories may comprise a category for no cell/entity in the droplet, a category for just one cell/entity in the droplet, and/or one or more categories (e.g. <10 categories) for more than one cell/entity in the droplet. For example in some implementations there is a single category for two or more cells, whereas in other implementations there may be a separate category for two cells/entities in the droplet, optionally a separate category for three cells/entities in the droplet, and so forth (e.g. up to 5-10 cells/entities per droplet), with an optional final category for larger numbers of cells/entities. In implementations this both adapts the technique to typical microfluidic droplet processing tasks to be performed and facilitates accurate counting by the neural network by restricting to small numbers of cells/entities.

In some implementations of the method the microfluidic process may be controlled to selectively perform one or more of sorting the droplet; dispensing the droplet; incubating the droplet; splitting the droplet; fusing the droplet; reducing a volume of the droplet; increasing a volume of the droplet; in response to the estimated number of cells/entities the droplet contains. For example droplets other than those determined to contain just a single cell/entity may be sent to waste or recycled and/or droplets determined to contain exactly one cell/entity may be incubated and/or dispensed into a reservoir and/or otherwise selected for further processing. Optionally a droplet volume may be reduced/increased, for example by sucking off or adding to part of the volume of a droplet using a side channel. Such a technique may be used, for example, to take an aliquot of the droplet for further analysis, for example by mass spectrometry, for example to identify one or more molecules present in the liquid of the droplet holding the entity. Taking an aliquot in this way can be used to ensure that a correct target cell has been identified for subsequent processing, for example by sorting, incubation, dispensing or the like.

In some implementations the method may include localizing, that is determining a position of, one or more cells/entities in the droplet. The microfluidic process may then be controlled in response to a determined location of the one or more cells/entities. For example a volume of a droplet may only be reduced when the cell/entity is identified as not adjacent a side channel used for the volume reduction. Additionally or alternatively a droplet containing two (or more) cells/entities may be only be split when the cells/entities are identified as physically separated from one another within the droplet and/or when the cells/entities are identified as in one or more defined locations, which can facilitate separation of entities.

In an innovative aspect one or more fluorescence or luminescence signals, potentially at different wavelengths, may be localized in a similar manner (e.g. as further described below), and the resulting information may then be used to control a microfluidic system to process droplets, for example to selectively sort/incubate/dispense the droplets.

In some implementations localizing, that is determining a position of, one or more cells/entities in the droplet (or potentially of a fluorescence or luminescence signal) may be performed by the convolutional neural network. For example a convolutional neural network may be trained to provide coordinates defining a position or boundary for one or more cells/entities in an image; this is particularly straightforward when only a single cell/entity is present. For example an optional regression head comprising one or more fully connected layers may be provided on the neural network in addition to a classification head which outputs classification probability data. The regression head may output coordinates defining a position or boundary box for a cell/entity. The regression head output may be trained after training the classification head output. Additionally or alternatively, once the number of cells/entities in a droplet has been determined by a method as described above, conventional rather than machine learning techniques may be employed to locate the cell(s)/entity(entities).

Once the position of one or more cells/entities in the droplet has been determined this information may be displayed to a user, for example superimposed on one or more or each of images from which the information was derived, in particular one or more images for which the count of cells/entities corresponds to the final estimated number of cells/entities. For example the one or more cells/entities each may be displayed with a boundary (box) around them. This can be useful in giving the use confidence that the count is correct, in effect providing the user with an explanation of why the neural network came to the decision that it did.

In some implementations the position of one or more cells/entities in the droplet may be used to capture or extract a higher resolution image of the cell(s)/entity(entities). For example in some implementations a system implementing the method may be provided with a lower resolution camera and a higher resolution camera. The lower resolution camera may be used to count the cells/entities and the higher resolution camera may be used to capture an image of one or more of the cells/entities, for example from one or more images for which the count of cells/entities corresponds to the final estimated number of cells/entities.

For example the higher resolution camera may be controlled to be directed at the target cell(s)/entity(entities), for example using a gimbal, or part of the field of view of the higher resolution camera may be selected. In some implementations rather than using lower and higher resolution cameras a reduced resolution version of an image captured by a camera may be processed by the neural network, for example to decrease processing power, and a full resolution of the image may provide the higher resolution image.

The higher resolution image, for example, may be presented to a user. In some implementations the higher resolution image may be processed by a set of one or more characterization neural networks to characterize the cell or other entity and/or an event associated with the cell or other entity, and outputting cell/entity/event characterization data. Characterization of a cell/entity in this way may thus be performed after localization of a cell/entity.

The characterization neural networks may comprise convolution or other neural networks configured to classify the higher resolution image. The set of neural networks may classify each of a plurality of characteristics, for example one neural network for each characteristic. These may be combined into a set of characteristics for the cell/entity. For example the characteristics may include one or more of: cell morphology (shape); cell/entity type; developmental stage; number of cells/entities; event detected/not detected; type of event detected (e.g. antibody binding). Additionally the characteristics may include types of visible feature, in particular fluorescent or luminescent (chemiluminescence or bioluminescence) feature (which may or may not be in a visible wavelength), which may be characteristic of a particular response, such as one or more of: a speckle or dot pattern; a ring/halo pattern, for example around a cell/entity; a haze pattern; and a uniform illumination pattern. A result of the characterization may be used to control, or further control, a microfluidic process, for example as described above, for example to selectively sort, incubate, or dispense cells.

In some implementations an image capture device used with the method/system may capture images in three dimensions or pseudo three dimensions. For example when using a camera with a narrow depth of field the focal distance of the camera may be scanned in the z-direction to capture image slices from different depths (where depth is measured in the z-direction for images in a (x,y) plane, for example from a point of plane of focus to a focal plane of the image capture device). Additionally or alternatively a 3D camera may be employed such as a time-of-flight imaging device. Still further additionally or alternatively a 3D view of a droplet or cell/entity may be synthesised from views at two or more different angles.

Data of this type, whether explicitly 3D or implicitly 3D (in that the data defines 3D aspects of the droplet or cell/entity without necessarily being converted to an explicit 3D image), may be processed to make decisions based on shape or e.g. other phenotypic cell changes. This may be employed independently of the above described cell-counting technique, for example in conjunction with the set of characterization neural networks described below.

The convolutional neural network may be a convolutional recurrent neural network. In this way the method/system may, for example, learn and respond to typical patterns of motion of cells/entities within a droplet for a potentially more accurate estimate of the number of cells/entities. The convolutional recurrent neural network may process the time sequence of images to provide a classification output as previously described. In some implementations a video image capture device may be employed and the time sequence of images of the droplet may then comprise a video image sequence of the droplet, for example in substantially real time.

In some implementations use of a convolutional recurrent neural network may facilitate processing of dynamic changes in the sequence of images/video, for example representing biological events. Such a convolutional recurrent neural network may be employed together with a method/system which counts cells/entities as described above, or independently from such a method/system, for example upstream or downstream of such a method/system. For example a set of one or more characterization neural networks to characterize the cell or other entity may include one or more convolutional recurrent neural networks. Such a set of neural networks may be used together with or independently from cell/entity counting techniques. A convolutional recurrent neural network may be trained to identify dynamic events from images or other signals which change with time. For example a wave or flash of fluorescence or luminescence (e.g. chemiluminescence or bioluminescence) may be detected.

Additionally or alternatively a time dependent event such as a flash of light may be detected using a non-recurrent neural network such as a convolutional or other neural network, from the sequence of images. For example an event may be identified if any one or more images of a captured sequence of images includes a signal representative of the event, such as transient fluorescence or luminescence; optionally it may further be required that one or more images fail to display the event to identify the event as transient. In a still further approach one or more captured images may be captured over an extended time period so that an image is blurred but is more likely to include a relevant event. For example the cell/entity counting convolutional neural network and/or another convolutional neural network may be used to identify presence of the transient cell/entity-associated signal in one or more of the captured time sequence of images. For example a separate head may be provided for the cell/entity counting convolutional neural network to output classification data identifying whether or not a target event or event type is considered to be present.

In some implementations of a method/system for detecting such dynamic events non-image-based data may be used additionally or alternatively to image data, for example data from single pixel detectors such as PMTs, photodiodes or the like. This data may be processed by the same or another neural network as previously described and/or by one or more neural networks of the set of characterizing neural networks described later.

There are many different type of biological event which may be detected in this way. Merely by way of example some of these include cell binding, molecule binding, cell lysis, phagocytosis, adherin-related events, cell signalling events, molecular movement, ion flux changes, molecular conformational changes, protein synthesis, molecular degradation, polymerisation, amplification, DNA editing, sequencing reactions, events related to beads, particles, quantum dots and other entities, for example which may have biological entities such as DNA attached.

When detecting a transient event a timing of the event may be controlled such that the event, if it happens, is likely to take place in a field of view of the camera or other image/signal detector. For example the method/system may comprise activating a cell/entity-associated event with a controlled timing upstream of a location of capturing a sequence of images of/signal from the droplet such that a transient cell/entity-associated optical signal is produced at the location of capturing. Activation of an event may be triggered by any suitable means including for example (but not limited to): temperature, a pulse of laser light, droplet/ cell/entity fusion, and injection of a trigger substance into a droplet. Merely by way of example the field of view of a camera or sensitive time of a signal capture device may be of the order of 5 microseconds to 50 ms; the time from trigger to an event may be of the order of 100 ms; but very different values may be accommodated.

Although some example implementations of the method/ system have been described which employ one or more cameras for image capture, additionally or alternatively a signal for processing by the cell/entity counting convolutional neural network and/or the set of characterization neural networks may be signal level such as a fluorescence or luminescence signal level.

Thus in some implementations the method/system may comprise, alternatively or further to image sequence capture, capturing a fluorescence-time or luminescence-time signal for the droplet, for example using a photomultiplier tube (PMT) or the like. In some implementations of this approach the method/system may further comprise processing the a fluorescence-time or luminescence-time signal using a set of one or more further signal processing neural networks to provide droplet characterization data characterizing the contents of the droplet. The characterization data may comprise or consist of a cell/entity count and/or other characterization data for example as previously described. The system/ method may use the characterization data for controlling the or another microfluidic process performed on the droplet, again as previously described.

In some implementations the droplet (or optionally cell/ entity) is illuminated with a substantially uniform sheet of light when capturing such a signal. This can substantially facilitate processing of the fluorescence-time or luminescence-time signal by helping to ensure repeatable measurements. Additionally or alternatively a slim, for example approximately droplet-sized or sub-droplet-sized microfluidic channel may be employed to assist in defining a droplet location for similar reasons. This may also be beneficial when obtaining a higher resolution image of the cell or other entity. In some implementations, which may be entirely independent of the other features of the method/system described herein, such a fluorescence-time or luminescence-time signal is processed by a neural network such as a convolutional neural network to count and/or characterize one or more peaks on the fluorescence or luminescence signal, for example to count/characterise cells/entities within the droplets.

There is also provided a method of training a neural network, for example for the system/method described above. Typically such a neural network may be trained using supervised learning based on a large (for example >100,000) labelled set of training images; the labels may be provided by humans. However it can be difficult for a human to identify when one cell/entity is obscured by another or when a one cell/entity is in some other way difficult to see.

Thus a method of training a neural network may comprise using two (or more) image capture devices, a first image capture device to capture training images for training the neural network and a second image capture device to capture labelling images for deriving labels for (human or machine) use in labelling the training images. In implementations the first and second image capture devices are configured to capture different images of the same droplet. For example the first and second image capture devices may be configured to capture images of the same droplet from different viewing angles, say from above and from the side, and/or at different wavelengths, for example one of the image capture devices being insensitive to or filtering out fluorescence or luminescence from a cell/entity within a droplet. Additionally or alternatively the image capture devices may have different resolutions, and/or exposure times and so forth. Merely by way of example a fluorescent label may be used to label a target cell/entity type for classification, for example a cell morphology, but a wavelength of this or a related wavelength such as a wavelength of a fluorescence probe, may be blocked by one of the image capture devices.

First and second data capturing devices, in particular first and second optical signal capturing devices, may be used additionally or alternatively to image capture devices. The optical signal capturing devices may capture an optical signal such as a fluorescence signal or luminescence signal, for example a chemiluminescence or bioluminescence signal. A time-variation of the optical signal may be captured, for example as a droplet passes the device(s). In this case the training data may comprise labelled examples of such time varying data/optical signals and a neural network or convolutional neural network may process these signals. In such an arrangement the method may use the neural network to count and/or characterise entities such as cells by processing the captured data/signal from a droplet. Optionally a sequence of time varying signals of the same droplet may be captured and processed for this purpose.

In some implementations the (trained) neural network may be compressed, that is a number of parameters or weights of the neural network may be reduced to facilitate running the neural network fast, for example in substantially real time, on a droplet processing instrument where sorting may be performed at, for example, 2-300 Hz or faster. For example a number of connections and/or convolutional filters may be reduced. Alternatively a knowledge distillation-based approach may be employed.

There is also provided a method/system of processing droplets containing one or more entities in a microfluidic system. The method/system may comprise capturing a time sequence of optical signals from a droplet as it passes through a channel in a microfluidic system. The method/system may further comprise processing the time sequence of optical signals using a set of one or more classifier neural networks to determine data characterizing one or more entities in the droplet. The method/system may further comprise controlling a microfluidic process performed on the droplet responsive to the data characterizing the one or more entities in the droplet. A captured optical signal may comprise a fluorescence or luminescence level signal, for example from a PMT, and/or a linescan camera, and/or an image signal.

There is also provided an instrument for microfluidic droplet-based processing of cells or other entities. The instrument may comprise a droplet generation system to generate one or more emulsions of droplets comprising cells or other entities. The emulsions may be water-in-oil or other emulsions; they may be double or multiple emulsions. The instrument may further comprise a microfluidic droplet processing system to process the droplets. The instrument may further comprise a droplet dispensing system to dispense the processed droplets into one or more reservoirs. The droplet processing system may comprise an image capture device to capture a sequence of images of a droplet as it passes through a channel in the microfluidic droplet processing system. The droplet processing system may further comprise a (trained) convolutional neural network to process each image of the sequence of images to count a number of cells or other entities visible in each image the droplet. The droplet processing system may further comprise a processor configured to determine an estimated number of cells or other entities in the droplet from the count of the number of cells or other entities visible in each image of the droplet, and/or to control the droplet dispensing system and/or a microfluidic process performed on the droplet prior to the droplet dispensing system, responsive to the estimated number of cells or other entities in the droplet.

The processor may comprise a microprocessor, for example as part of a general purpose computer, optionally with a hardware accelerator such as a GPU (graphics processing unit), TPU (tensor processing unit) or other ML (machine learning) accelerator, and/or dedicated hardware such as an FPGA.

There is also provided an instrument for microfluidic droplet-based processing of cells or other entities. The instrument may comprise a droplet generation system to generate one or more emulsions of droplets comprising cells or other entities. The emulsions may be water-in-oil or other emulsions; they may be double or multiple emulsions. The instrument may further comprise a microfluidic droplet processing system to process the droplets. The instrument may further comprise a droplet dispensing system to dispense the processed droplets into one or more reservoirs. The droplet processing system may comprise an optical signal capture device to capture a time sequence of optical signals from a droplet as it passes through a channel in the microfluidic droplet processing system. The droplet processing system may further comprise a set of one or more (trained) classifier neural networks to process the time sequence of optical signals to determine data characterizing one or more entities in the droplet. The droplet processing system may further comprise a processor configured to control the droplet dispensing system and/or a microfluidic process performed on the droplet prior to the droplet dispensing system, responsive to the data characterizing the one or more entities in the droplet.

There is further provided processor control code and data, for example neural network parameter (weight) data, to implement the above-described methods and systems, for example on one or more general purpose computer systems, and/or GPUs, or digital signal processors (DSPs), or on configurable or dedicated hardware. The code/data may be provided on one or more a non-transitory physical data carriers such as a disk or programmed memory such as non-volatile memory (e.g. Flash) or read-only memory (Firmware). Code (and/or data) to implement examples of the system may comprise source, object or executable code in a conventional programming language (interpreted or compiled) such as C, or assembly code, or code for a hardware description language. The code and/or data to implement the systems may be distributed between a plurality of coupled components in communication with one another.

BRIEF DESCRIPTION OF THE DRAWINGS

These and other aspects of the invention will now be further described, by way of example only, with reference to the accompanying figures in which:

FIG. 7 shows example images from a microfluidic system for processing droplets implementing the techniques described herein.

DETAILED DESCRIPTION OF PREFERRED EMBODIMENTS

Figure 1:
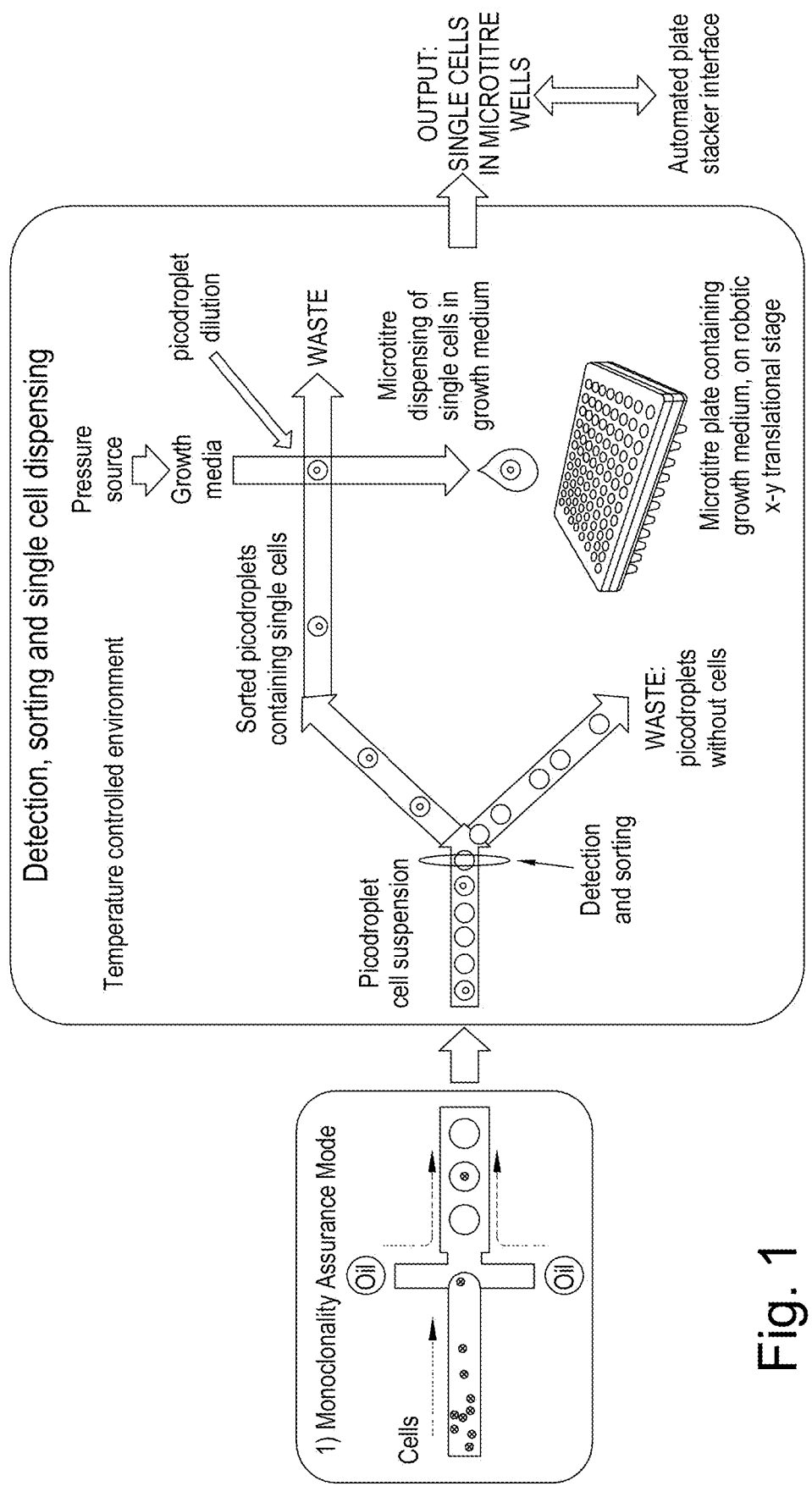
FIG. 1 shows a schematic diagram of a droplet generation, detection, sorting and dispensing system.

FIG. 1 shows a schematic illustration of a first example of a droplet generation, detection, sorting and dispensing system. In this example, multiple cells are provided in a fluid, in this example water, usually including a growth medium. In the first step, individual droplets are formed from the fluid. As outlined above, this may be achieved by using, for example, T-junctions, flow focusing devices, or other devices. The droplets which have been generated are, in this example, transported in a fluid of oil.

The individual droplets, which may or may not contain one or more cells, are then guided through the microfluidic device in an oil emulsion.

In this example, the droplet cell suspension, i.e. the droplets in the oil emulsion, are guided towards a detection and sorting device. Whether or not a single droplet contains one or more cells may be detected in the analyser, based on one or more of electrical, optical, thermal, acoustic, mechanical, temporal, spatial, and other physical characteristics of the droplets. Based on the analysis in the analyser, i.e. the determination as to whether a single droplet contains one or more target cells, the droplet may be sorted in the droplet sorting device. In this example, droplets which do not contain one or more cells are put to waste. Furthermore, droplets which contain, in this example, the single cell of interest are guided towards a decoupler of the microfluidic system.

Droplets which contain one or more cells of interest are then extracted from the first fluidic flow path and transferred into a second fluidic flow path. In this example, the target droplets are extracted from the first fluidic flow path in a growth media fluid. A droplet which contains a target cell, whereby the droplet is incorporated in the growth media fluid, is then dispensed into a microtitre plate via pressurised fluid ejection. A pressure source is, in this example, attached to the flow path at which the growth media fluid is injected. The droplets may thereby be diluted. A robotic xy translational stage is provided in this example in order to dispense droplets into different wells of the microtitre plate.

The droplet detecting, sorting and cell dispensing may, in this example, be performed in a temperature controlled environment.

In this example, droplets which contain a single cell and which are not to be disposed into the microtitre plate, may be guided in the first fluidic flow path to waste.

Using the techniques described herein the probability for finding a single cell in a single droplet which is disposed into the microtitre plate may be higher than 95% or 99%.

In the example of FIG. 1, an automated plate stacker interface may be provided, in order to stack various microtitre plates on top of each other.

In some preferred implementations of the system of FIG. 1, and similarly of the later described systems, an imaging device such as a camera is provided at or close to the point at which the droplets are dispended (into the microtitre plate). The imaging device may be used to image a droplet to determine whether the droplet contains just a single cell (or other biological entity), or alternatively two or more cells, or no cells. In other approaches optical detection of scatter from a droplet may be detected for this purpose. Such an optical system may then be used as a tool to monitor monoclonality, more particularly in conjunction with a control system to identify and log when a well does not contain just a single cell (or vice-versa), for example so that the system may then flag an error for the identified well.

Figure 2:
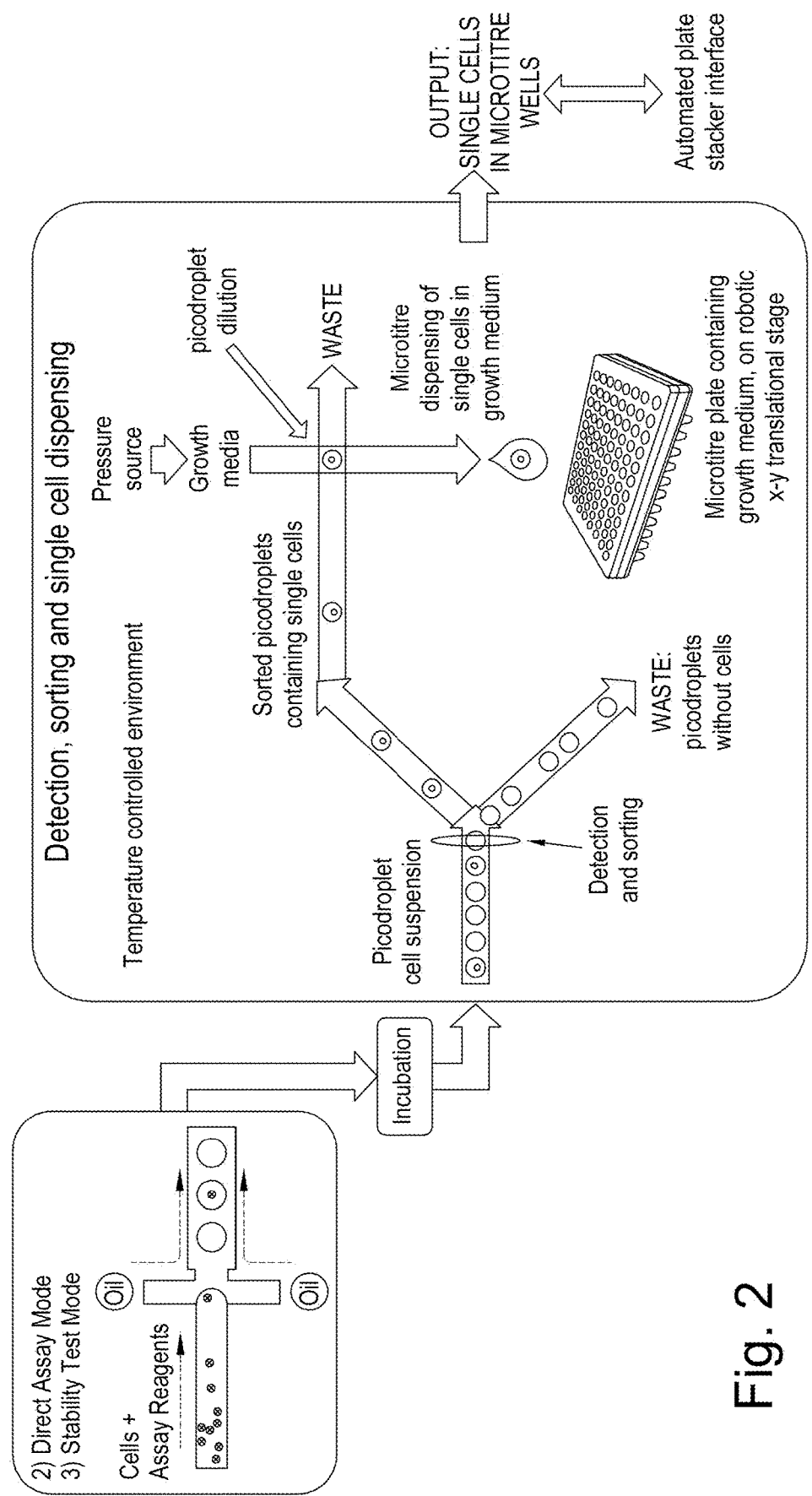
FIG. 2 shows a schematic diagram of a further example of a droplet generation, incubation, detection, sorting and dispensing system.

FIG. 2 shows a schematic illustration of a further example of a droplet detection, sorting and dispensing system.

In this example, cells are provided in a fluid together with assay reagents. Individual droplets are then formed from the fluid as outlined in the example shown in FIG. 1.

Droplets which have been prepared from the fluid containing cells and assay reagents, are then guided into an incubator. The incubator may be used to grow and/or maintain the cells in the droplets. As outlined above, the incubator may comprise a stability test unit which allows for performing stability tests on the cells during the incubation. Performing a stability test on a cell in a single droplet allows for sorting only viable cells during the detection and sorting steps in the analyser and droplet sorting device, which have not degraded or died during the stability test.

Further steps of determining the content of a droplet, sorting the droplet based on the determination, and a potential extraction of a droplet of interest in the decoupler are performed as outlined with regard to the schematic illustration of FIG. 1.

Figure 3:
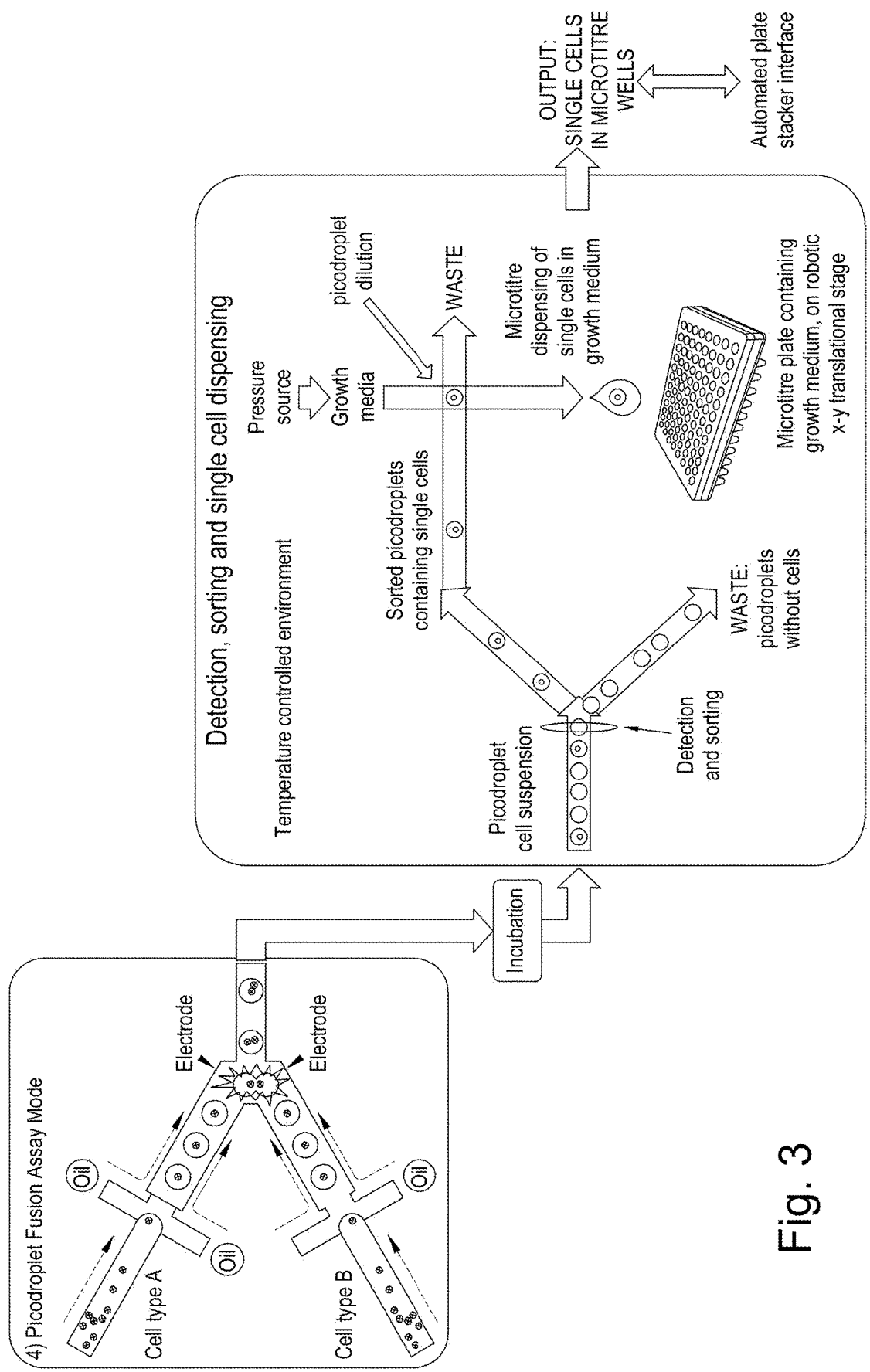
FIG. 3 shows a schematic diagram of a further example of a droplet generation, fusion, incubation, detection, sorting and dispensing system.

FIG. 3 shows a schematic illustration of a further example of a droplet detection, sorting and dispensing system.

In this example a droplet fusion assay mode is illustrated. The first cell type A is provided in a first fluid. Individual droplets are then formed from this first fluid. A second cell type B is provided in a second fluid, from which individual droplets are formed. Droplets which have been prepared from the first fluid, as well as droplets which have been prepared from the second fluid, are guided towards a fusion device (electrodes in FIG. 3). In this example, two droplets from the first and second fluids, respectively, are prepared by electro-coalescence. The fused droplets may then be processed further as shown in the schematic illustrations of FIG. 1 and/or FIG. 2.

As outlined above, the droplet fusion device may be placed, for example, behind the analyser and droplet sorting device in a fluid flow direction of the microfluidic system. Such a configuration may allow for fusing droplets in the droplet fusion device only for droplets which have been determined to contain, in this example, cells which are of interest for growth and/or further analysis and processing.

Figure 4:
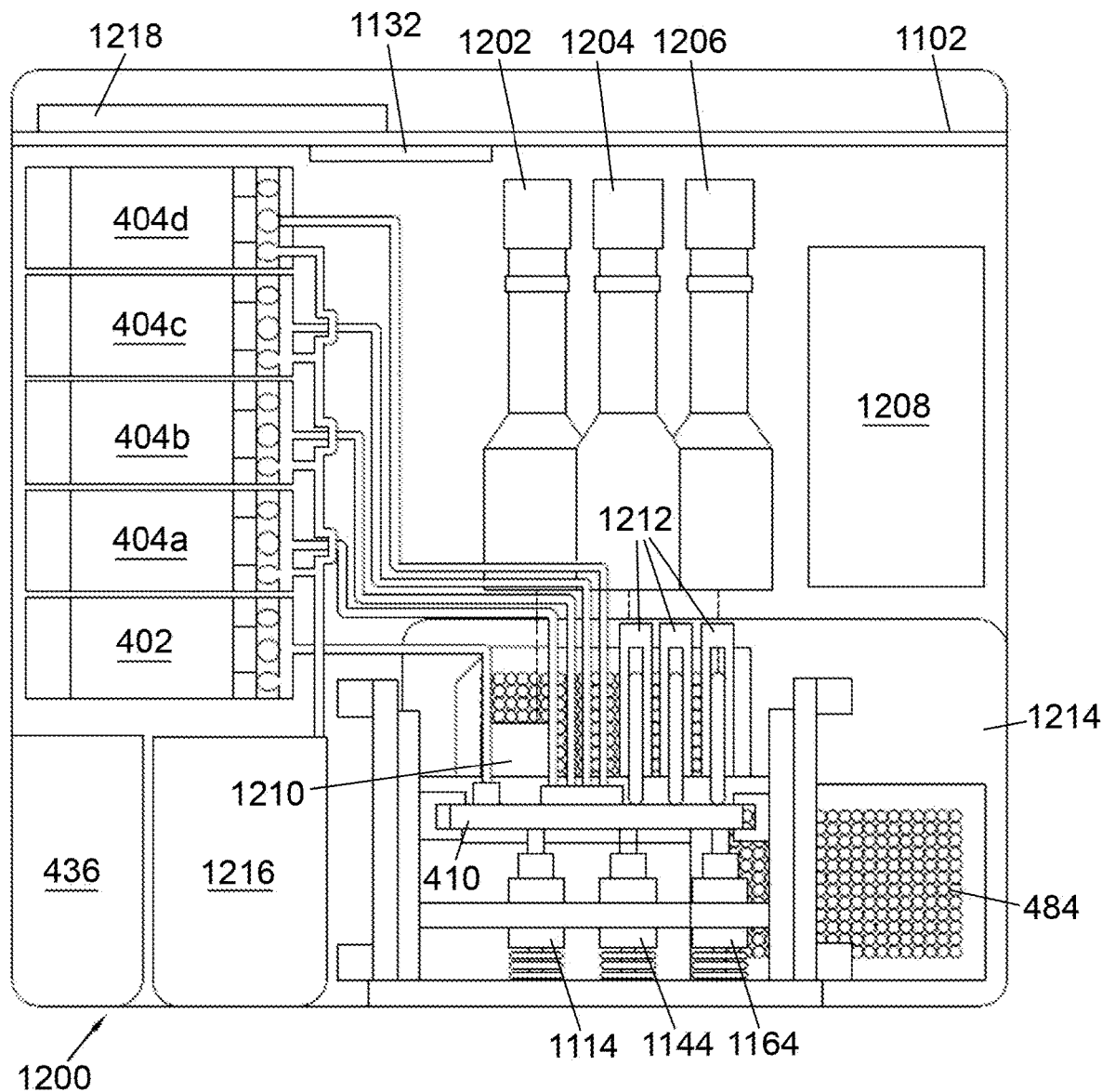
FIG. 4 shows an example physical configuration of a droplet processing system.

FIG. 4 shows an example physical configuration of a droplet processing instrument 1200. The system/instrument 1200 may incorporate a (disposable) microfluidic cartridge 410 and may have a reservoir 402 holding an aqueous medium, generally including growth media, within which biological entities such as mammalian cells, bacteria or the like are held for processing. A set of reservoirs 404*a-d* (which may include pumps) hold oil for providing an emulsion at various stages of the system. Although reservoirs 402, 404 are shown as part of the instrument rather than part of the cartridge, in other configurations they may be part of the cartridge; depending upon the cartridge function, for example whether it is to be used for a fusion or functional assay, there may be more than one aqueous reservoir 402. The fluids from reservoirs 402, 404 are pumped by respective pumps. A set of fluid flow lines may connect to respective ports on the cartridge when the cartridge is inserted into the instrument (as shown in the figure). The cartridge 410 may comprises a droplet generation region, and/or a droplet incubation/storage region, and/or a droplet sorting region, and/or a flow buffer region, and/or a droplet dispenser. In implementations of the cartridge each of these regions may be modular and an emulsion flow processing configuration may be selected by selecting modules to attach to a cartridge base or holder so that the selected modules interface with one another to perform a desired function for a particular cartridge.

The droplet dispenser may apply a pressure pulse to the emulsion flowing in an output channel, for example via a compressed air line, to eject a slug of emulsion containing a selected, target droplet for collection in a well of a multi-well reservoir 484. The emulsion may be created off-cartridge and added to a reservoir.

FIG. 4 shows locations of one or more cameras 1202, 1204, 1206 for example for, respectively, droplet generation, sorting and dispensing. These may have respective (LED) illumination 1114, 1144, 1164, for example under control of an LED controller 1208. The figure also illustrates a heater plate 1210 of an incubator for the cartridge, and valve actuators 1212 for droplet generation and incubation, either or both of which may be present in some implementations. The multi-well plate 484 may be mounted on an X-Y stage 1214. The instrument may also includes an internal oil container 1216 to supply these reservoirs. Excess oil may flow to waste through into a reservoir 436 from which, potentially, the oil may be recycled. The instrument may include a control system; and may further include a user interface 1218.

Figure 5:
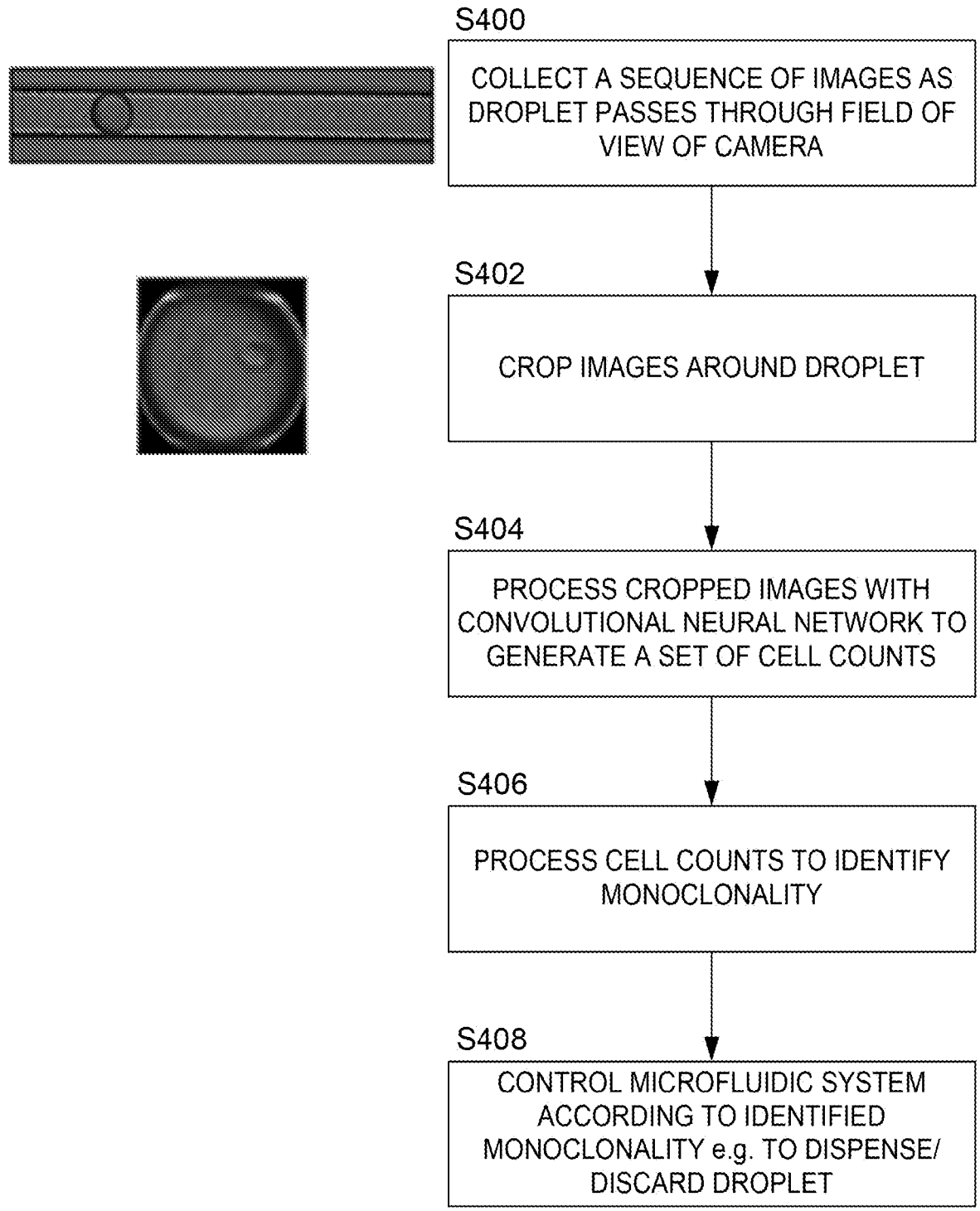
FIG. 5 shows a flow diagram of a method of processing droplets in a microfluidic system in an implementation of the techniques described herein.

FIG. 5 shows a flow diagram of a procedure for processing droplets in a microfluidic system in an implementation of the techniques described herein. Thus at step S400 the procedure captures a sequence of images, for example 5 images, of the same droplet as it passes through the field of view of a camera. Each image may then be processed by cropping around the droplet to create a smaller, cropped image (S402). Optionally the image resolution may also be reduced, for example to provide an 80×80 monochrome image.

Each cropped image is then processed by a convolutional neural network which classifies a cell count of the droplet image as either: 0, 1, or 2+ cells (S404). The convolutional neural network architecture may be varied according to the input image resolution, number of category outputs, quantity and quality of training data, degree of regularization employed and so forth. A manual or automated tool may be used to select/optimise a network architecture and number of nodes. Merely by way of example, in one implementation the convolutional network was trained with 180,000 labelled images and employed the architecture below; such a convolutional network by may implemented using software such as TensorFlow or the like:

| Layer type | Shape | Parameters |
| --- | --- | --- |
| Conv2d_1 | (78, 78; 20) | 560 |
| Activation_1 | (78, 78; 20) | 0 |
| Conv2d_2 | (76, 76; 53) | 9593 |
| Activation_2 | (76, 76; 53) | 0 |

-continued

| Layer type | Shape | Parameters |
| --- | --- | --- |
| Conv2d_3 | (74, 74; 86) | 41108 |
| Activation_3 | (74, 74; 86) | 0 |
| Conv2d_4 | (72, 72; 119) | 92225 |
| Activation_4 | (72, 72; 119) | 0 |
| Conv2d_5 | (70, 70; 152) | 162944 |
| Activation_5 | (70, 70; 152) | 0 |
| MaxPooling_2d_1 | (35, 35; 152) | 0 |
| Flatten_1 | (186200) | 0 |
| FullyConnected_1 | (200) | 37240200 |
| Activation_6 | (200) | 0 |
| FullyConnected_2 | (3) | 603 |

Total parameters 37,547,233

The set of cell counts is then processed to determine an estimated number of cells in the droplet, for example by determining the mode of the count for each image, or by determining a maximum number of cells counted (S406) e.g. to identify monoclonality of a droplet. In applications of the system which relate to assuring monoclonality (i.e. a single cell per droplet) it may be advantageous to err on the side of false positive non-monoclonal identifications. The microfluidic system may then be controlled (S408) according to the number of cells identified in a droplet, for example to discard droplets with 0 or 2+ cells per droplet, or to split droplets with 2 cells, and so forth.

Figure 6:
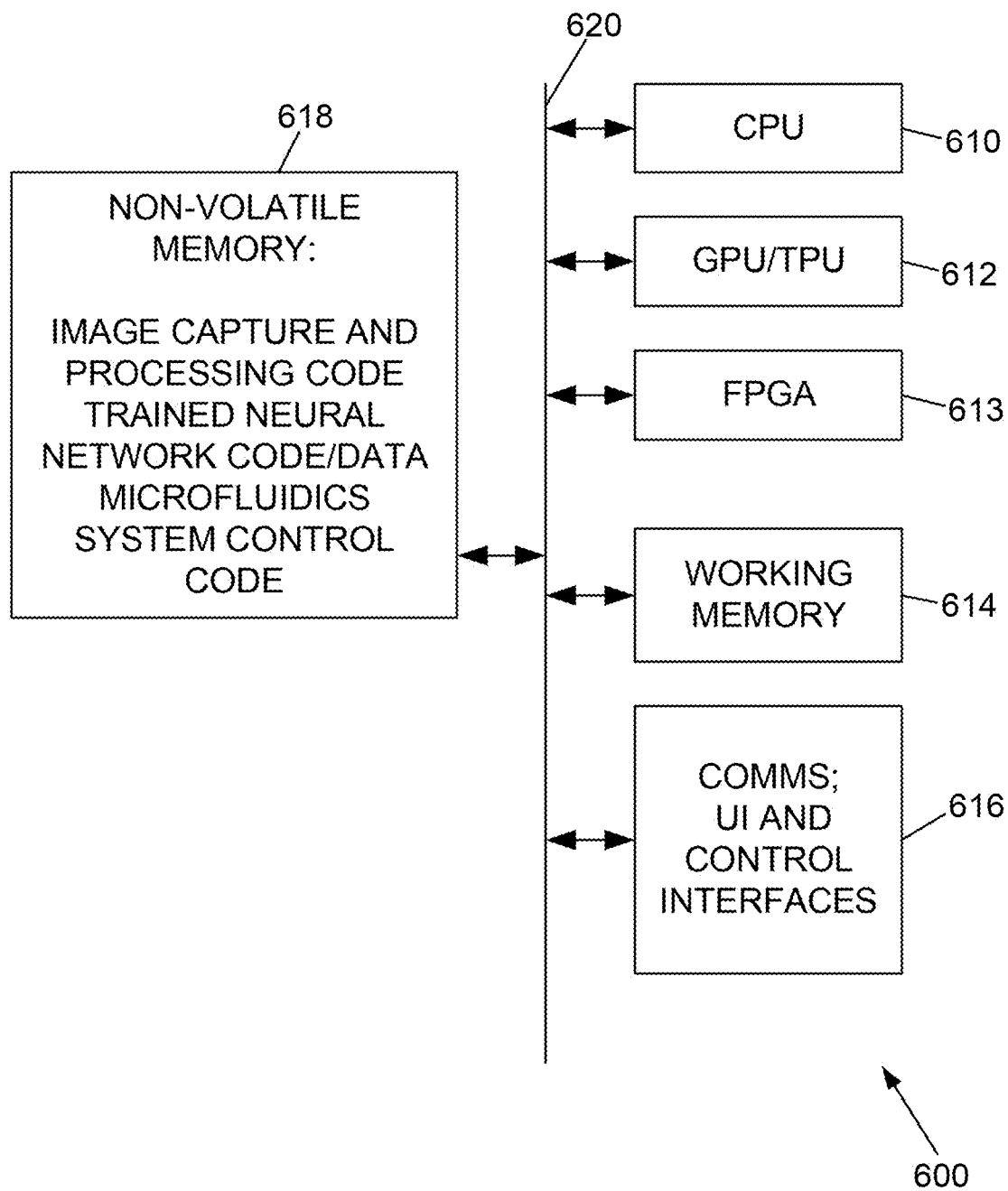
FIG. 6 shows a block diagram of processor for implementing the method of FIG. 5.

FIG. 6 shows a block diagram of a processor 600 configured to implement the procedure of FIG. 5. Thus the processor comprises a microprocessor 610 and optionally a GPU/TPU or similar 612 and/or other hardware acceleration such as an FPGA 613, coupled to working memory 614 and to various interfaces 616 such as communications, control, and user interfaces. Non-volatile memory 618 stores code to implement the method and data, in particular trained neural network parameters to implement the one or more neural networks of the system such as the above described convolutional neural network. These different components may be interconnected via a bus 620.

FIGS. 7a and 7b illustrate some of the difficulties in accurately determining the number of cells in a droplet from an image of the droplet—for example a cell may be stuck to the droplet edge and/or partly hidden in shadow and/or two cells may be touching and/or a cell may have an irregular shape.

The convolutional neural network may be trained to identify the number of cells in a droplet and after training may accurately identify the number of cells in a droplet using the above described method. A large data set is advantageous for training. To increase the size of the dataset a labelled image of a droplet may be transformed e.g. by reflection/rotation as illustrated in FIG. 7b (which shows, by way of example, one image transformed into three images for training). In one implementation around 180,000 training images were available. It can be advantageous to approximately balance the number of examples in each category of image identified by the neural network (so that a likely correct answer cannot simply be obtained by selecting the most populous category). Optionally training images may be captured with different camera focus accuracy.

Figure 8:
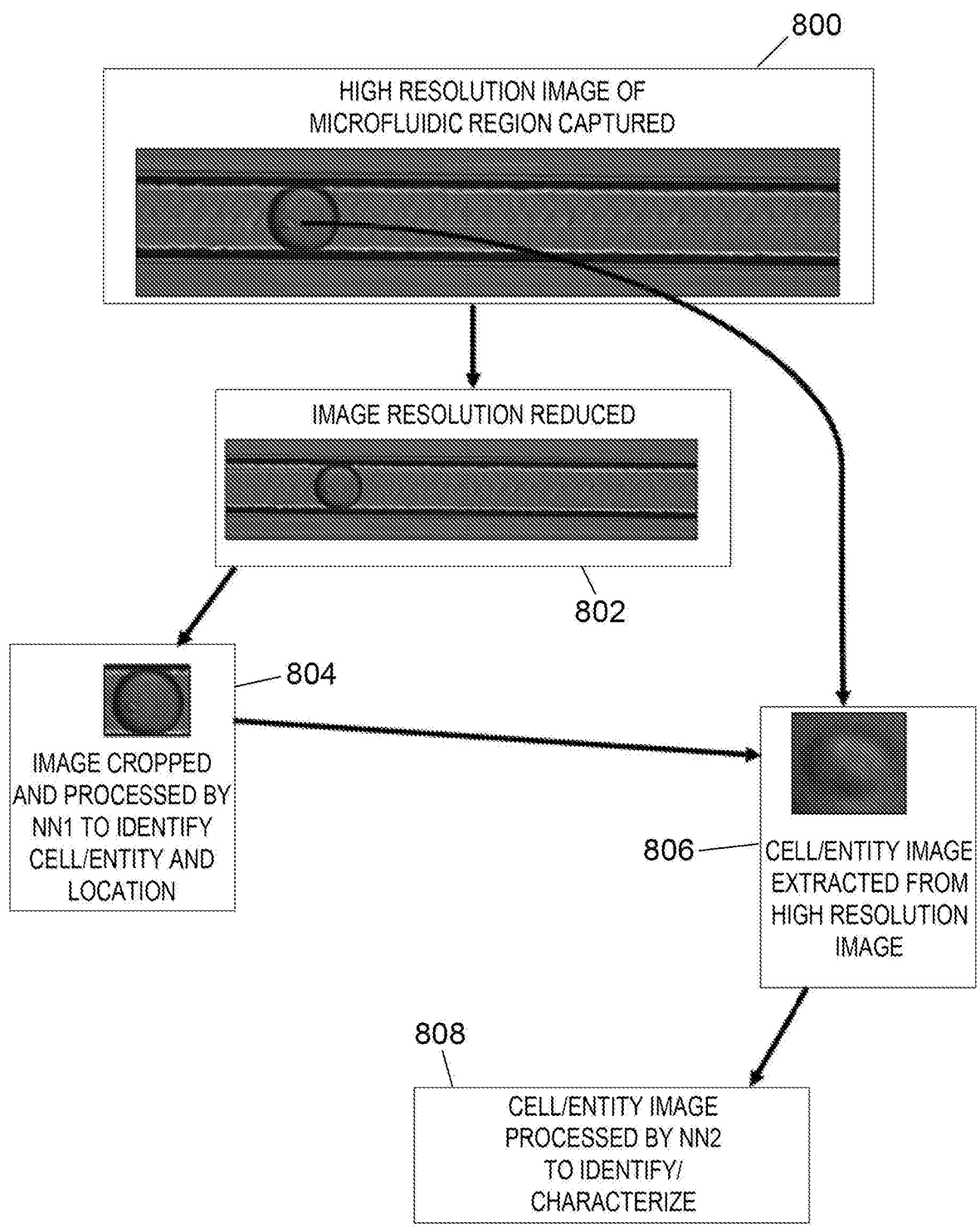
FIG. 8 schematically illustrates a two stage procedure for identifying and classifying a cell/entity.

FIG. 8 schematically illustrates a two stage procedure for identifying and classifying a cell/entity. This technique may be used together with or independent from the above described techniques.

In broad terms a first neural network, e.g. a convolutional neural network (CNN), receives and processes image data from a captured image to identify whether a cell or other entity is present and (if present) to output data identifying a location(s) of the cell(s)/entity(entities).

Then the image data is processed using the output of the first neural network to generate a version of the image data for processing by a second neural network, e.g. convolutional neural network. The version of the image data may be a higher resolution version of the image data, and/or may be cropped around the location of the cell(s)/entity(entities); thus the version of the image data may define a smaller physical region of the image at higher resolution, including the target cell(s)/entity(entities). This may then be processed by the second neural network to classify the cell(s)/entity (entities) into one of a plurality of categories. The categories may define shapes/morphologies of a cell/entity and/or other properties as previously described. Optionally a plurality of second neural networks may be provided to classify a cell/entity according to a set of parameters each with different respective categories; the set of categories for the parameters into which a cell/entity is classified may characterise the cell/entity.

In more detail, a two-step neural network system may be used for efficient use of image data and for accurate classification of a cell/other entity. A two-step network with two different CNNs can facilitate efficient training and execution of a CNN system, potentially in real time, potentially without having to sacrifice accuracy (which could occur if the image resolution was decreased). Thus in an example of such a system:

CNN Network 1—identifies if a cell/other entity is present and the location of cell/other entity CNN Network 2—classifies cell/other entity through recognition of features CNN Network 1 may be trained to identify if a cell/entity is present with a classification head, and then within the droplet the actual location of the identified cell/entity with a regression head. It or another process then uses the coordinates of the identified cell/entity to crop and single out the cell/entity from the original high-resolution image creating a very small (e.g. 200×200) but high-resolution image of just the cell/entity, which is sent to Network 2.

CNN Network 2 may be trained to identify what the cell/entity is i.e. cell/entity type, optionally along with any other characteristics the CNN has been trained to identify.

Thus referring again to FIG. 8, at step 800 a high resolution image of a microfluidic region, e.g. a channel, is captured; this may be, e.g., a 50 megapixel image. The image resolution is reduced (802), and then optionally cropped around a droplet (804). This reduced resolution, cropped image is provided to a first neural network (NN1) which identifies whether a cell/entity is present and (if present) a location of the cell/entity in the image e.g. as (x,y) coordinates of the cell/entity (804).

The location, e.g. (x,y) coordinates of the cell/entity is then used to extract a higher resolution image of the cell/entity from the original high resolution image (806). This higher resolution image is cropped around the cell/entity and covers a region which is smaller than that of the droplet e.g. substantially just containing the cell/entity itself.

The smaller, high resolution extracted image of the cell/entity cut-out is then provided to a second neural network (NN2) which processes the image e.g. to identify and/or characterize (classify) the cell/entity.

No doubt many other effective alternatives will occur to the skilled person. For example although some example implementations have been described with reference to cells the techniques may be applied with droplets containing other entities including, but not limited to, beads, particles, and quantum dots.

Although methods and systems which capture a 2D image have been described, in principle the techniques may be employed with 1D images captured, for example, by a line-scan camera. Similarly, where there are references to capturing optical and other data from a droplet and/or its contents, this data may be collected by techniques including, but not limited to: PMT signal data, diffraction pattern data, single pixel detection data, non-optical detection methods such as electrical and acoustic signal data, and other types of data collection.

It will be understood that the invention is not limited to the described embodiments and encompasses modifications apparent to those skilled in the art lying within the spirit and scope of the claims appended hereto.

The invention claimed is:

1. A method of processing droplets in a microfluidic system, the method comprising:
    capturing a sequence of images of a droplet as it passes through a channel in a microfluidic system;
    processing each image of the sequence of images using a convolutional neural network to count a number of cells or other entities visible in each image of the droplet;
    processing the count of the number of cells or other entities visible in each image of the droplet to determine an estimated number of cells or other entities in the droplet; and
    controlling a microfluidic process performed on the droplet responsive to the estimated number of cells or other entities in the droplet,
    wherein processing each image of the sequence of images using the convolutional neural network to count the number of cells or other entities visible in each image of the droplet comprises classifying each image of the droplet into one of a plurality of categories, wherein the categories comprise at least three categories, a category for no cell or other entity in the droplet, a category for just one cell or other entity in the droplet; and at least one category for more than one cell or other entity in the droplet.

2. A method of processing droplets in a microfluidic system, the method comprising:
    capturing a sequence of images of a droplet as it passes through a channel in a microfluidic system;
    processing each image of the sequence of images using a convolutional neural network to count a number of cells or other entities visible in each image of the droplet;
    processing the count of the number of cells or other entities visible in each image of the droplet to determine an estimated number of cells or other entities in the droplet; and
    controlling a microfluidic process performed on the droplet responsive to the estimated number of cells or other entities in the droplet,
    wherein processing each image of the sequence of images using a convolutional neural network comprises processing each image at a first resolution; the method further comprising localizing a cell or other entity in a captured image, using the localizing to provide a second, higher resolution image of the cell/entity, processing the second, higher resolution image of the cell or other entity using a set of one or more characterization neural networks to characterize the cell or other entity and/or an event associated with the cell or other entity, and outputting characterization data for the cell or other entity.

3. A method as claimed in claim 2, further comprising illuminating the droplet with a substantially uniform sheet of light to provide the fluorescence-time or luminescence-time signal for the droplet and/or the second, higher resolution image of the cell or other entity.

4. A method of processing droplets in a microfluidic system, the method comprising:
   capturing a sequence of images of a droplet as it passes through a channel in a microfluidic system;
   processing each image of the sequence of images using a convolutional neural network to count a number of cells or other entities visible in each image of the droplet;
   processing the count of the number of cells or other entities visible in each image of the droplet to determine an estimated number of cells or other entities in the droplet; and
   controlling a microfluidic process performed on the droplet responsive to the estimated number of cells or other entities in the droplet,
   wherein the method is used for identifying a transient cell/entity-associated signal, the method comprising activating a cell/entity-associated event with a controlled timing upstream of a location of capturing the sequence of images of the droplet such that a transient cell/entity-associated optical signal is produced at the location of capturing the sequence of images; the method further comprising using the or another convolutional neural network to identify a presence of the transient cell/entity-associated signal in one or more of the captured sequence of images.

* * * * *